May 8, 1951 C. H. LISCH, JR., ET AL 2,552,101
TRANSFER MECHANISM
Filed Dec. 15, 1949

INVENTORS
FRANK SCHUMAN AND
BY CHARLES H. LISCH JR.
Oberlin & Limbach
ATTORNEYS.

Patented May 8, 1951

2,552,101

UNITED STATES PATENT OFFICE 2,552,101

TRANSFER MECHANISM

Charles H. Lisch, Jr., Grosse Pointe Woods, and Frank Schuman, Detroit, Mich., assignors to Young Brothers Company, Detroit, Mich., a corporation of Michigan Application December 15, 1949, Serial No. 133,172

10 Claims. (Cl. 198—134)

This invention relates to rack-type conveyors, and more particularly to transfer mechanism for such conveyors, whereby work-pieces transported by the latter may be readily transferred to a moving take-off belt or belts.

In the heat processing of thin, flat sheets, such as lithographed plates, it is customary to transport the sheets through an oven on a conveyor, the respective courses of which lie one above the other, having a plurality of outwardly extending, closely spaced racks therealong for supporting the sheets on edge. A typical example of this type of conveyor is shown in Patent No. 2,406,821, issued to V. A. Fox under date of September 3, 1946. As the racks pass over the work discharging end of the conveyor, the sheets are deposited flatwise on a pair of laterally spaced, travelling take-off belts which are respectively positioned on opposite sides of the racks, and thereby removed from the conveyor. Such arrangement, however, is adapted to accommodate only relatively wide sheets which overlap their respective racks sufficiently to contact such laterally spaced belts, and is clearly unsuited for removal of sheets of lesser width than such racks.

It is accordingly a primary object of this invention to provide a transfer mechanism for removing relatively narrow work-pieces from a rack-type conveyor onto a moving take-off belt without tipping, skewing or sagging of the work-pieces.

Portions of the apparatus employed to illustrate the principle of our invention are similar to apparatus shown in Fox Patent No. 2,406,821 and insofar as common parts are utilized, reference is made thereto for details of construction.

Figure 1:
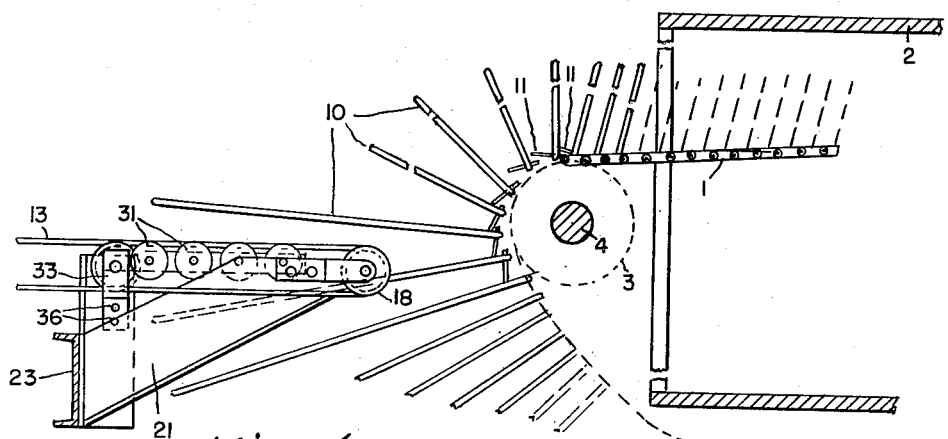
Fig. 1 is a side view of the work discharging end of a conveyor shown travelling through an oven, and showing also a portion of a take-off belt and transfer mechanism illustrating one embodiment of our invention.
Figure 2:
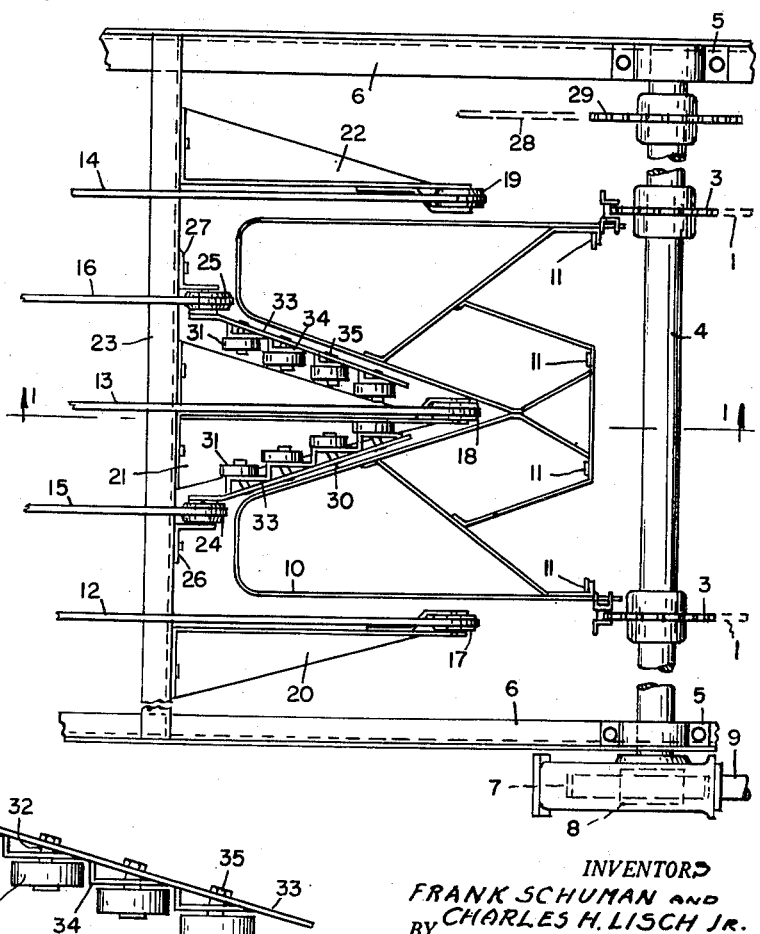
Fig. 2 is a top plan view of the apparatus illustrated in Fig. 1, omitting the oven.
Figure 3:
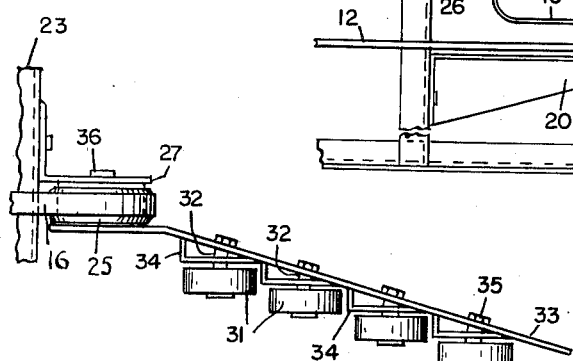
Fig. 3 is an enlarged detail view of a portion of the transfer mechanism illustrated in the first two figures.

Referring now to the drawing and more especially to Figs. 1 and 2 thereof, the apparatus to which this invention relates includes a conveyor which may comprise parallel runs of endless chains 1. The upper course of the conveyor travels through an oven generally indicated at 2, the chains 1 engaging sprockets 3 secured to shaft 4, such shaft 4 being mounted in pillow blocks 5, secured to channels 6. Shaft 4 is provided with a gear 7 keyed to the end thereof which is driven by a worm 8 keyed to longitudinally extending shaft 9. An electric motor, not shown, may be provided to drive shaft 9 in conventional manner. Provided at intervals along the conveyor are a plurality of closely spaced racks 10 which are inclined oppositely to the direction of travel of the upper conveyor course and on which the sheets are carried. The racks consist of open frames having flanges or lips 11 at the bottom thereof for supporting the sheets on edge.

Located at the work discharging end of the conveyor and arranged in tandem therewith are endless take-off belts 12, 13, 14, 15 and 16 which are provided for removing the sheets from their respective racks. The belts 12, 13 and 14 are carried respectively by pulleys 17, 18 and 19 mounted on brackets 20, 21 and 22 bolted to the transverse channel 23. The belts 15 and 16 are carried by pulleys 24 and 25, respectively, mounted on upstanding brackets 26 and 27, likewise bolted to the transverse channel 23. Independent means may be provided to drive the belts, or power may conveniently be taken from the conveyor as by a chain 28 driven by sprocket 29 keyed to shaft 4 thereof. Each rack has a V-shaped notch or indentation 30 formed centrally inwardly from the outer edge thereof so that the racks may pass the belt 13 and its pulley and bracket, and also rollers 31 positioned in two series on opposite sides of belt 13, without interference therewith.

The rollers 31 have axes parallel to the belt pulley axes and are progressively increasingly laterally spaced to the extent permitted by the generally V-shaped notch 30 in the work supporting racks, the upper surface of the rollers being flush with the upper surface of the belt 13 so that as each sheet is deposited on the belt 13 it simultaneously contacts the rollers. Each of the rollers 31 is mounted on a pin or axle 32, bent as shown, which extends through support 33 and respective bracket 34 welded thereto, such axle being secured in position by nut 35. The supports 33 are mounted on brackets 26 and 27, respectively, as by means of bolts 36. A ball-bearing journal is desirably provided for the rollers 31 with a circumferential groove in the shoulder of the axles 32 providing an inner race for the ball-bearings.

Thus, anti-friction means, mounted on either side of belt 13 and arranged to conform to the notches 30 of the racks to permit passage of the latter therepast, are provided to offer lateral support to the sheets as they are successively deposited on the travelling belt 13.

In operation, the sheet material is carried on the racks along the upper course of the conveyor travelling through a heat processing oven, for example. These racks are inclined oppositely to the direction of conveyor travel until they reach the work discharging end of the conveyor, whereupon they tilt forward, as shown in Fig. 1 of the drawing, causing the sheets thereon to shift to the rear side of the next preceding rack. Thus, as each rack passes the work discharging end of the conveyor, the sheet carried thereby may be deposited on moving belts 12, 13 and 14 and rollers 31, such belts quickly removing the same from the path of the next succeeding rack, belts 15 and 16 assisting in this action as soon as the sheet is moved into contact therewith. Where the sheets are not of sufficient width to contact the outer belts 12 and 14, they are deposited on the central belt 13 only which extends into the notch 30 of the racks, lateral support being provided by the rollers 31 until the sheets are moved into contact with the belts 15 and 16. The rollers thus serve the purpose of preventing tipping or skewing of the sheets until the latter come in contact with the belts 15 and 16. Furthermore, where the sheets transported are relatively thin and likely to sag, such tendency to sag is prevented since the upper surface of the rollers is substantially flush with the upper surface of the belt.

Although the transfer mechanism herein described has been indicated as being serviceable in connection with the drying of lithographed plates, it is clear that it has a wider field of use and may be employed wherever it is desired to transfer work pieces from a rack-type conveyor whose runs lie one above the other to a moving take-off belt. Further, although the work-pieces transported will generally comprise relatively thin, flat sheets, clearly the transfer mechanism is equally useful for material of other conformations.

Other modes of applying the principle of the invention may be employed, change being made as regards the details described, provided the features stated in any of the following claims, or the equivalent of such, be employed.

We therefore particularly point out and distinctly claim as our invention:

1. In combination with an endless conveyor having courses lying one above the other, rack members carried thereby in closely-spaced relation for supporting sheet material on edge, each such rack member having a V-shaped notch formed centrally inwardly from the outer edge thereof, an endless travelling takeoff belt in tandem with such conveyor and travelling in the same direction arranged to extend into the notch of such rack members as the latter pass thereby and adapted to receive and carry away sheet material deposited flatwise thereon from such respective rack members, and second and third takeoff belts travelling in a direction parallel to that of the first such belt and laterally spaced on opposite sides of such first belt adapted to assist in carrying away such sheet material when the latter has been moved into contact therewith by action of such first belt, the upper surface of such three belts lying in a common horizontal plane; a plurality of rollers mounted in two series on opposite sides of such first belt in V-shaped arrangement to correspond to the notches of such rack members and thereby permit passage of the latter, adapted to provide lateral support for such sheet material as the latter is successively deposited on such first belt, said rollers having their upper surfaces in a common horizontal plane with such three belts.

2. In combination with an endless conveyor having courses lying one above the other, rack members carried thereby in closely-spaced relation for supporting sheet material on edge, each such rack member having a notch formed centrally inwardly from the outer edge thereof, an endless travelling takeoff belt in tandem with such conveyor and travelling in the same direction arranged to extend into the notch of such rack members as the latter pass thereby and adapted to receive and carry away sheet material deposited flatwise thereon from such respective rack members, and second and third takeoff belts travelling in a direction parallel to that of the first such belt and laterally spaced on opposite sides of such first belt adapted to assist in carrying away such sheet material when the latter has been moved into contact therewith by action of such first belt, the upper surfaces of such three belts lying in a common horizontal plane; a plurality of rollers mounted in two series on opposite sides of such first belt arranged to correspond to the notches of such rack members and thereby permit passage of the latter, adapted to provide lateral support for such sheet material as the latter is successively deposited on such first belt, said rollers having their upper surfaces in a common horizontal plane with such three belts.

3. In combination with an endless conveyor having courses lying one above the other, rack members carried thereby in closely-spaced relation for supporting sheet material on edge, each such rack member having a notch formed centrally inwardly from the outer edge thereof, an endless travelling takeoff belt in tandem with such conveyor arranged to extend into the notch of such rack members as the latter pass thereby and adapted to receive and carry away sheet material deposited flatwise thereon from such respective rack members, and second and third takeoff belts travelling in a direction parallel to that of the first such belt and laterally spaced on oppositely sides of such first belt adapted to assist in carrying away such sheet material when the latter has been moved into contact therewith by action of such first belt, the upper surfaces of such three belts lying in a common horizontal plane; a plurality of rollers mounted in two series on opposite sides of such first belt arranged to correspond to the notches of such rack members and thereby permit passage of the latter, adapted to provide lateral support for such sheet material as the latter is successively deposited on such first belt, said rollers having their upper surfaces in a common horizontal plane with such three belts.

4. In combination with an endless conveyor having courses lying one above the other, rack members carried thereby in closely-spaced relation for supporting sheet material on edge, each such rack member having a notch formed centrally inwardly from the outer edge thereof, and an endless travelling takeoff belt in tandem with such conveyor arranged to extend into the notch of such rack members as the latter pass thereby and adapted to receive and carry away sheet material deposited flatwise thereon from such respective rack members; a plurality of rollers mounted in two series on opposite sides of such belt arranged to correspond to the notches of such rack members and thereby permit passage of the latter, adapted to provide lateral support for such sheet material as the latter is successively deposited on such belt, the upper surface of said rollers and the upper surface of such belt lying in a common horizontal plane.

5. In combination with an endless conveyor having courses lying one above the other, rack members carried thereby in closely-spaced relation for supporting sheet material on edge, each such rack member having a notch formed inwardly from the outer edge thereof, and an endless travelling takeoff belt in tandem with such conveyor arranged to extend into the notch of such rack members as the latter pass thereby and adapted to receive and carry away sheet material deposited flatwise thereon from such respective rack members; a plurality of rollers positioned on opposite sides of such belt arranged to conform to the notches of such respective rack members and thereby permit passage of the latter, adapted to provide lateral support for such sheet material as the latter is successively deposited on such belt.

6. In combination, an endless conveyor having rack members arranged in closely spaced relation thereon to transport generally flat work-pieces flatwise to the direction of conveyor travel, each said rack members having a notch formed inwardly from the outer edge thereof, an endless travelling takeoff belt in close association with said conveyor travelling in a direction generally normal to the direction of travel of said conveyor at such point of close association, said belt arranged to extend into the notch of said respective rack members as the latter pass thereby and adapted to receive and carry away work-pieces deposited flatwise thereon from said respective rack members, and a plurality of rollers positioned on opposite sides of such belt arranged to conform to the notches of such respective rack members and thereby permit passage of the latter, adapted to provide lateral support for such work-pieces as the latter are successively deposited on such belt, the upper surface of said rollers and the upper surface of such belt lying in a common horizontal plane.

7. In combination, an endless conveyor having rack members arranged in closely spaced relation thereon to transport generally flat work-pieces flatwise to the direction of conveyor travel, each said rack member having a V-shaped notch formed inwardly from the outer edge thereof, an endless travelling takeoff belt in close association with said conveyor travelling in a direction generally normal to the direction of travel of said conveyor at such point of close association, said belt arranged to extend into the notch of said respective rack members as the latter pass thereby and adapted to receive and carry away work-pieces deposited flatwise thereon from said respective rack members, and anti-friction means positioned on opposite sides of said belt in V-shaped arrangement to conform to the notches of said rack members and thereby permit passage of the latter, adapted to provide lateral support for such work-pieces as the latter are successively deposited on said belt, said anti-friction means and the upper surface of said belt lying in a common horizontal plane.

8. In combination, an endless conveyor having rack members arranged in closely spaced relation thereon to transport generally flat work-pieces flatwise to the direction of conveyor travel, each said rack member having a V-shaped notch formed inwardly from the outer edge thereof, an endless travelling takeoff belt in close association with said conveyor travelling in a direction generally normal to the direction of travel of said conveyor at such point of close association, said belt arranged to extend into the notch of said respective rack members as the latter pass thereby and adapted to receive and carry away work-pieces deposited flatwise thereon from said respective rack members, and anti-friction means positioned on opposite sides of said belt in V-shaped arrangement to conform to the notches of said rack members and thereby permit passage of the latter, adapted to provide lateral support for such work-pieces as the latter are successively deposited on said belt.

9. In combination, an endless conveyor having rack members arranged in closely spaced relation thereon to transport generally flat work-pieces flatwise to the direction of conveyor travel, each said rack member having a notch formed inwardly from the outer edge thereof, an endless travelling takeoff belt in close association with said conveyor travelling in a direction generally normal to the direction of travel of said conveyor at such point of close association, said belt arranged to extend into the notch of said respective rack members as the latter pass thereby and adapted to receive and carry away work-pieces deposited flatwise thereon from said respective rack members, and anti-friction means positioned on opposite sides of said belt arranged to conform to the notches of said rack members and thereby permit passage of the latter, adapted to provide lateral support for such work-pieces as the latter are successively deposited on said belt.

10. In combination, an endless conveyor having rack members arranged in closely spaced relation thereon to transport generally flat work-pieces flatwise to the direction of conveyor travel, each said rack member having a notch formed inwardly from the outer edge thereof, an endless takeoff belt in close association with said conveyor travelling in a direction generally normal to the direction of travel of said conveyor at such point of close association, said belt arranged to extend into the notch of said respective rack members as the latter pass thereby and adapted to receive and carry away work-pieces deposited flatwise thereon from said respective rack members, and supporting means positioned on opposite sides of said belt arranged to conform to the notches of said rack members and thereby permit passage of the latter, adapted to provide lateral support for such work-pieces as the latter are successively deposited on said belt.

CHARLES H. LISCH, Jr.
FRANK SCHUMAN.

No references cited.